United States Patent [19]

Mitten et al.

[11] Patent Number: 6,078,192
[45] Date of Patent: Jun. 20, 2000

[54] CIRCUIT AND METHOD FOR USING THE I²C SERIAL PROTOCOL WITH MULTIPLE VOLTAGES

[75] Inventors: John W. Mitten, Cary; Jack Petty, Chapel Hill, both of N.C.

[73] Assignee: Ericsson, Inc., Research Triangle Park, N.C.

[21] Appl. No.: 08/933,111

[22] Filed: Sep. 18, 1997

[51] Int. Cl.⁷ .................. H03K 19/0175; H03K 19/094; H03K 19/082
[52] U.S. Cl. ................ 326/82; 326/81; 326/86; 326/90; 326/68
[58] Field of Search .................. 326/80, 81, 86, 326/90, 82, 83, 63, 68

[56] References Cited

U.S. PATENT DOCUMENTS

| | | | |
|---|---|---|---|
| 4,853,560 | 8/1989 | Iwamura et al. | 326/80 |
| 5,084,637 | 1/1992 | Gregor | 326/81 |
| 5,311,083 | 5/1994 | Wanlass | 326/68 |
| 5,521,530 | 5/1996 | Yao et al. | 326/80 |
| 5,903,737 | 5/1999 | Han | 710/100 |

OTHER PUBLICATIONS

RF/Wireless Communications Data Handbook, Philips Semiconductors, pp. 131–149.

*Primary Examiner*—Michael Tokar
*Assistant Examiner*—James H. Cho
*Attorney, Agent, or Firm*—Burns, Doane, Swecker & Mathis, L.L.P.

[57] ABSTRACT

An apparatus and method wherein networked communications devices having different operating voltages share information according to the I²C protocol, using unidirectional level shifters. A first bidirectional line having a first operating voltage shares information according to the I²C protocol with a second bidirectional line having a second operating voltage different from the first operating voltage, where at least one of the bidirectional lines is split into two lines and connected to the other bidirectional line via unidirectional level shifters.

28 Claims, 7 Drawing Sheets

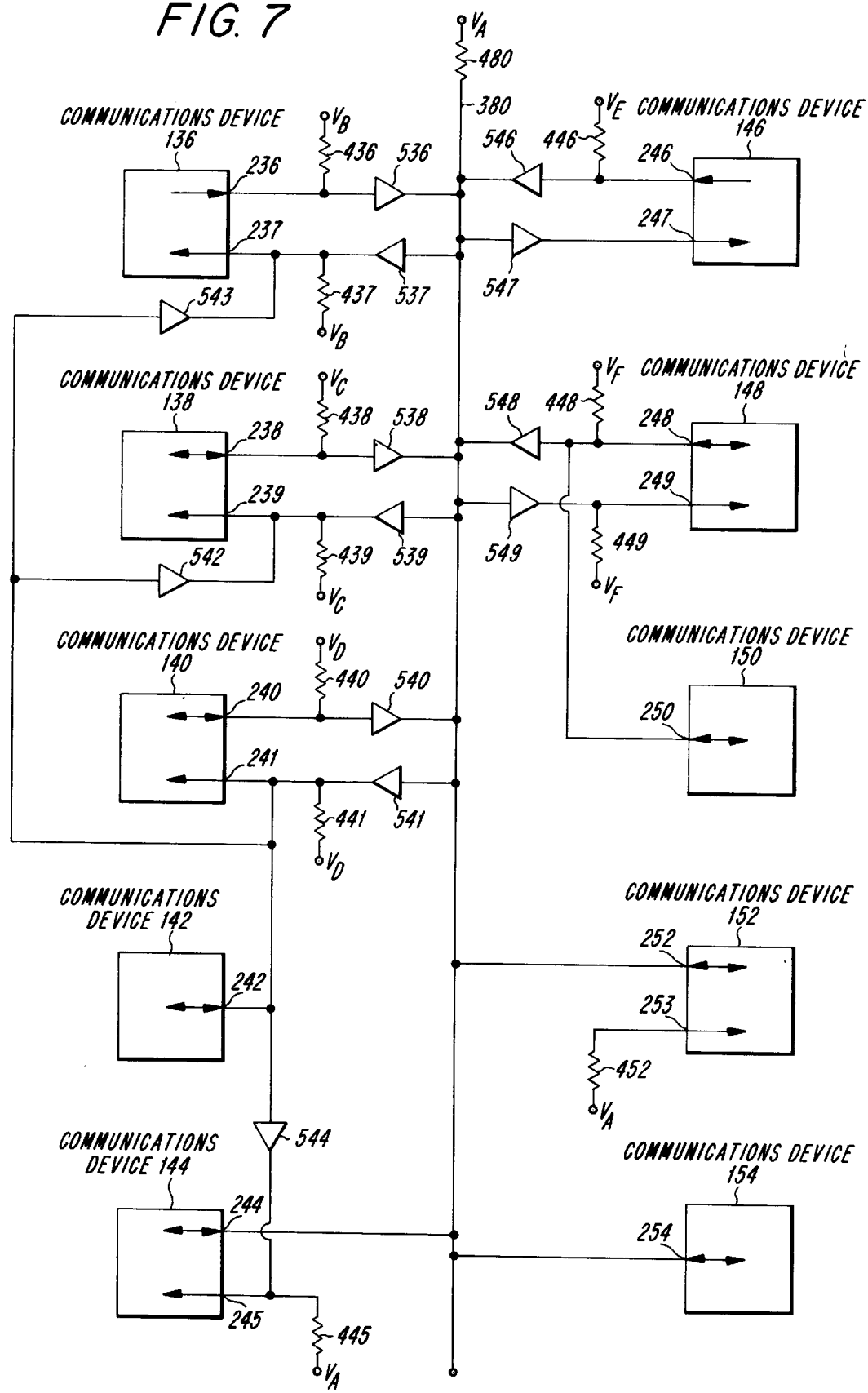

CIRCUIT AND METHOD FOR USING THE I²C SERIAL PROTOCOL WITH MULTIPLE VOLTAGES

BACKGROUND OF THE INVENTION

This invention generally relates to the field of communication systems and, more particularly, to the exchange of data using the I²C bidirectional serial protocol.

The I²C protocol can be used for communicating data within a system having at least one microcomputer and other peripheral devices, e.g., memories and I/O expanders. The I²C protocol is especially useful when the cost of connecting various devices within the system must be minimized, and high speed data transfer is not required.

In particular, the I²C protocol is a two-pin, bidirectional serial protocol that uses a data signal on one pin and a clock signal on the other pin. The protocol is symmetrical with respect to each of the pins, so that the same rules apply to bidirectional transfer of data information through the data pin as apply to bidirectional transfer of clock information through the clock pin. For a more thorough description of the I²C protocol, see, e.g., *RF/Wireless Communications Data Handbook,* Philips Semiconductors, copyright 1992, pages 896–914, which is hereby incorporated by reference.

According to the I²C protocol, communications devices are connected to a bidirectional data line and to a bidirectional clock line to form a network. Each bidirectional line is pulled to a logical HIGH level, for example by a pullup resistor connected at one end to the bidirectional line and connected at the other end to voltage source having a voltage corresponding to the logical HIGH level. Each of the communications devices outputs either a floating signal or a logical LOW signal onto the bidirectional line.

When a communications device outputs a floating signal, in effect the communications device is disconnected from the bidirectional line with respect to output. A floating output does not alter a voltage present on the bidirectional line.

Thus, when one or more communications devices outputs a logical LOW signal onto the bidirectional line, for example by connecting the bidirectional line to ground, and the remaining communications devices output a floating signal, a logical LOW signal is present on the bidirectional line. When all of the communications devices output a floating signal, the pullup resistor connected to the bidirectional line and to the voltage source causes the voltage of the voltage source to be present on the bidirectional line. This situation is known as a "wired AND" arrangement, and is required by the I²C protocol.

Two devices can communicate with each other according to the I²C protocol only if each device can receive signals from the other device.

Furthermore, the I²C protocol specifies that a device that initiates communication with another device is a "master", and the device that responds is a "slave". Because of the arbitration scheme specified in the I²C protocol, a "master" must be able to receive signals from all other communications devices that act as masters and use the same bidirectional lines. Alternatively, when a first communications device cannot receive signals from a second communications device, an additional mechanism can be provided to prevent the first and second communications devices from acting as masters at the same time. For example, when it is desired that one of the first and second communications devices act as a master, the other of the first and second communications devices can either be a) isolated or removed from the network, or b) enabled to act only as a slave.

FIG. 1 shows a conventional circuit wherein two communications devices 198, 199 are connected so that they can communicate with each other according to the I²C protocol.

As shown in FIG. 1, the two communications devices 198, 199 are connected to a bidirectional data line 396 by lines SDATA1 and SDATA2, and to a bidirectional clock line 397 by lines SCLK1 and SCLK2.

Clock signals are transmitted and received through the SCLK1 and SCLK2 lines, and data signals are transmitted and received through the SDATA1 and SDATA2 lines.

Each of the communications devices 198, 199 has an operating voltage of $V_{DD}$. Thus, each of the communications devices 198, 199 expects a logical HIGH signal on the SCLK1, SCLK2, SDATA1 and SDATA2 lines to have a voltage level corresponding to $V_{DD}$.

As shown in FIG. 1, the SCLK1_out line of the communications device 199 is connected to a device such as a field-effect transistor (FET) having a drain connected to ground and having a source connected to the SCLK1 line and therefore to the bidirectional clock line 397. Accordingly, activation of the SCLK1_out line turns the FET ON and connects the bidirectional clock line 397 to ground and pulls the voltage on the bidirectional clock line 397 to a ground potential.

The communications device 198 has a similar arrangement with respect to its SCLK2_out line, which when activated also pulls the voltage on the bidirectional clock line 397 to a ground potential. In this way, either of the communications devices 198, 199 can pull the bidirectional clock line 397 to a ground potential.

In the communications device 199, the SCLK1 line is also connected to an input of a buffer 700. An output of the buffer 700 is connected to the SCLK1_in line. Thus, the SCLK1_in line reflects whatever logical signal is represented on the bidirectional clock line 397. For example, a ground potential on the bidirectional clock line 397 would represent a logical LOW, and a voltage of $V_{DD}$ on the bidirectional clock line 397 would represent a logical HIGH.

The SCLK2_out, SCLK2_in, DATA1_out, DATA1_in, DATA2_out, and DATA2_in lines are configured in the same way as the SCLK1_out and SCLK1_in lines, and operate in the same fashion with similar effects.

Conventional systems that use the I²C protocol contain communications devices that all have the same operating voltage. "Operating voltage" as used in this document refers to a specified voltage for a particular device that corresponds to a voltage of a logical HIGH signal for the particular device. In certain applications, it may be desirable to use the I²C protocol for communications devices having different operating voltages. Typical solutions for multiple voltage levels use bidirectional voltage level shifters.

However, bidirectional level shifters generally cannot be used to transfer data in a system using the I²C protocol. This is because transmitting signals in different directions through a bidirectional level shifter requires that the transmission direction of a signal be known at any given time so that the bidirectional level shifter will transmit the signal in the proper direction. According to the I²C protocol, the signal transmission direction is unknown until after data transmission has already begun. Consequently, using bidirectional level shifters to transmit signals in different directions according to the I²C protocol is problematic, and the problem of how to connect communications devices having different operating voltages remains.

SUMMARY OF THE INVENTION

The invention solves the foregoing problems, and provides other advantages, by providing for an apparatus and method wherein communications devices having different operating voltages communicate according to the I²C protocol, using unidirectional level shifters.

According to one embodiment of the invention, to achieve communication according to the I²C protocol between a first bidirectional line having a first operating voltage and a second bidirectional line having a second operating voltage, at least one of the bidirectional lines is split into two lines and connected to the other bidirectional line via one or more unidirectional level shifters.

According to one embodiment of the invention, a communications system circuit includes a first communications device that has an operating voltage, and at least a first terminal and a second terminal. The circuit also includes a first level shifter connected between the first terminal of the first communications device and a bidirectional line. The bidirectional line has an operating voltage that is different from the operating voltage of the first communications device. In addition, a second level shifter is connected between the second terminal of the first communications device and the bidirectional line.

Additional features and advantages of the invention will become apparent from the following description of the preferred embodiment, taken in conjunction with the accompanying drawings. The accompanying drawings illustrate, by way of example, the principles of the invention.

BRIEF DESCRIPTION OF THE DRAWINGS

FIG. 7 is a circuit diagram showing a fourth I²C compliant circuit according to the invention, including connection patterns shown in FIGS. 2, 4, 7 and 8, and additional connection patterns.

DETAILED DESCRIPTION

As described above, the I²C protocol requires two circuits, one for transferring clock signals and one for transferring data signals. However, since the I²C protocol applies identical requirements to both the transfer of clock signals and data signals, the two circuits can have the same design. Accordingly, for simplicity's sake circuits according to the invention are shown and described only with respect to data signals, with the understanding that the same circuits can be used for clock signals.

Figure 1:
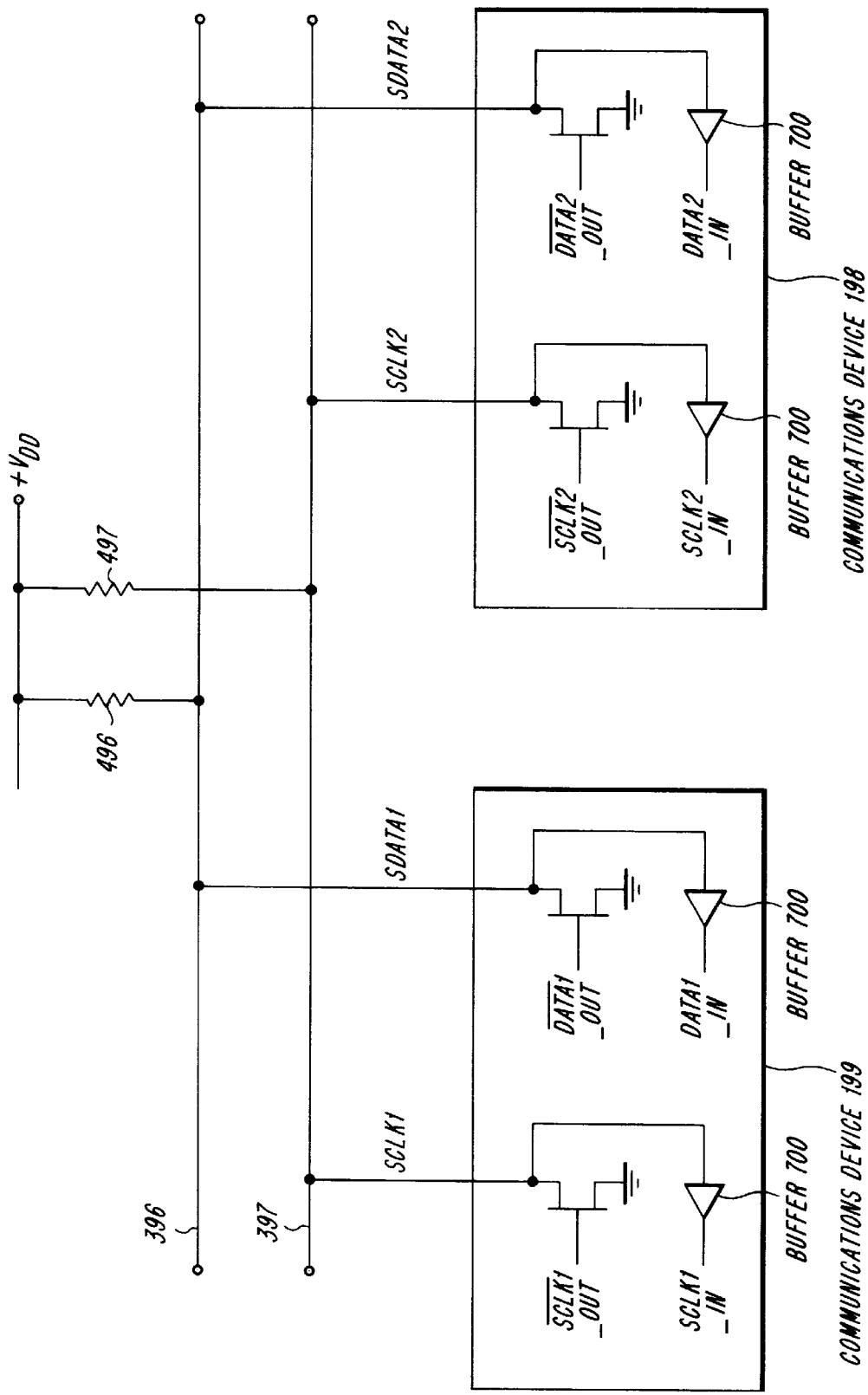
FIG. 1 is a circuit diagram showing a conventional I²C-compliant circuit.
Figure 2:
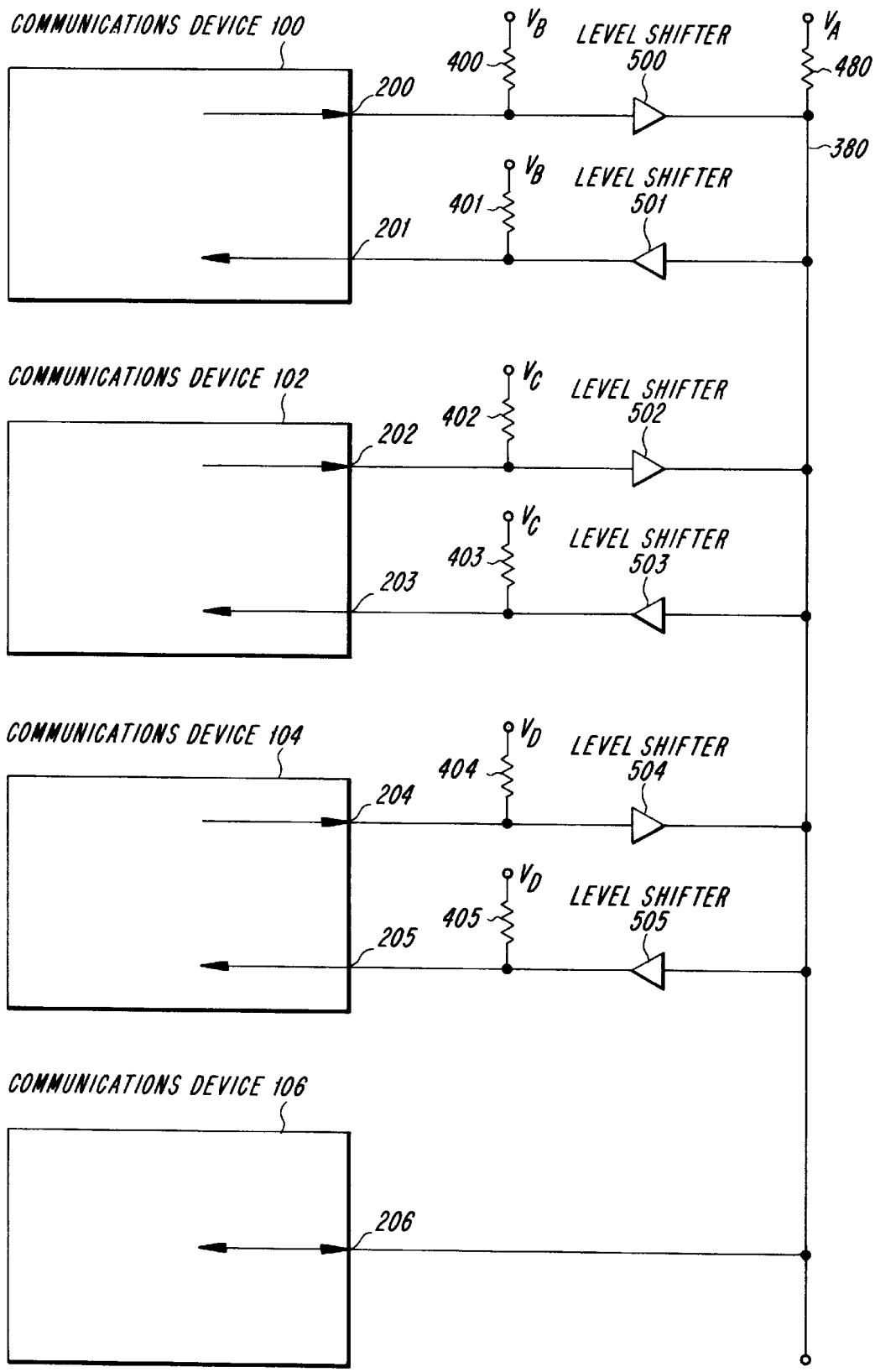
FIG. 2 is a circuit diagram showing a first I²C-compliant circuit according to the invention.

FIG. 2 is a circuit diagram showing a first I²C-compliant circuit in accordance with the invention, wherein each of the communications devices can receive a signal from any of the other communications devices.

In FIG. 2, four communications devices 100, 102, 104 and 106 are connected to a bidirectional data line 380. The communications devices 106, 100, 102 and 104 have operating voltages of $V_A$, $V_B$, $V_C$ and $V_D$ respectively. Thus, the communications devices 100, 102 and 104 each have a different operating voltage from each other and from the operating voltage $V_A$ of the bidirectional data line 380.

The communications devices 100, 102 and 104 have output data lines 200, 202 and 204, and input data lines 201, 203 and 205, respectively.

The communications device 106 is a conventional device and has the same operating voltage $V_A$ as the bidirectional data line 380. The communications device 106 also has a single input/output data line 206 connected directly to the bidirectional data line 380. When the input/output data line 206 functions as an output line, the input/output data line 206 outputs either a logical LOW signal or has a floating output.

Pullup resistors 400, 402 and 404 pull the output data lines 200, 202 and 204, and the input data lines 201, 203 and 205 of the communications devices 100, 102 and 104 to the respective operating voltages of the communications devices.

In addition, unidirectional level shifters 500, 502 and 504 are connected between the output data lines 200, 202 and 204 of the communications devices 100, 102 and 104 and the bidirectional data line 380. The outputs of the level shifters 500, 502 and 504 are connected to the bidirectional data line 380, and the inputs of the level shifters 500, 502 and 504 are connected to the output data lines 200, 202 and 204 of the communications devices 100, 102 and 104.

Unidirectional level shifters 501, 503 and 505 are connected between the input data lines 201, 203 and 205 of the communications devices 100, 102 and 104 and the bidirectional data line 380. The inputs of the level shifters 501, 503 and 505 are connected to the bidirectional data line 380, and the outputs of the level shifters 501, 503 and 505 are connected to the input data lines 201, 203 and 205 of the communications devices 100, 102 and 104.

Each of the level shifters 500–505 outputs a logical LOW signal when a logical LOW signal is applied to the input of the level shifter. When a logical HIGH is applied to the input, the level shifter has a floating output. This is because the voltage level of a logical LOW signal is basically the same regardless of operating voltage level, i.e., regardless of the voltage level of a logical HIGH signal. In addition, a floating output can easily be pulled to a logical LOW voltage level. Thus, each level shifter acts as an interface between two lines having different operating voltages, while preserving the wired AND condition necessary for the I²C protocol.

Since the outputs of the level shifters 501, 503 and 505 float in response to a logical HIGH input from the bidirectional data line 380, the input data lines 201, 203 and 205 of the communications devices 100, 102 and 104 must be pulled high in the absence of a logical LOW output from the level shifters 501, 503 and 505. This is accomplished by the pullup resistors 401, 403 and 405 that are connected respectively to the input data lines 201, 203 and 205 of the communications devices 100, 102 and 104 and to voltage sources corresponding to the operating voltages of the communications devices 100, 102 and 104. Converting a logical HIGH signal to a floating signal and then converting the floating signal to a logical HIGH signal is necessary because the logical HIGH signals have different voltage levels.

Figure 3:
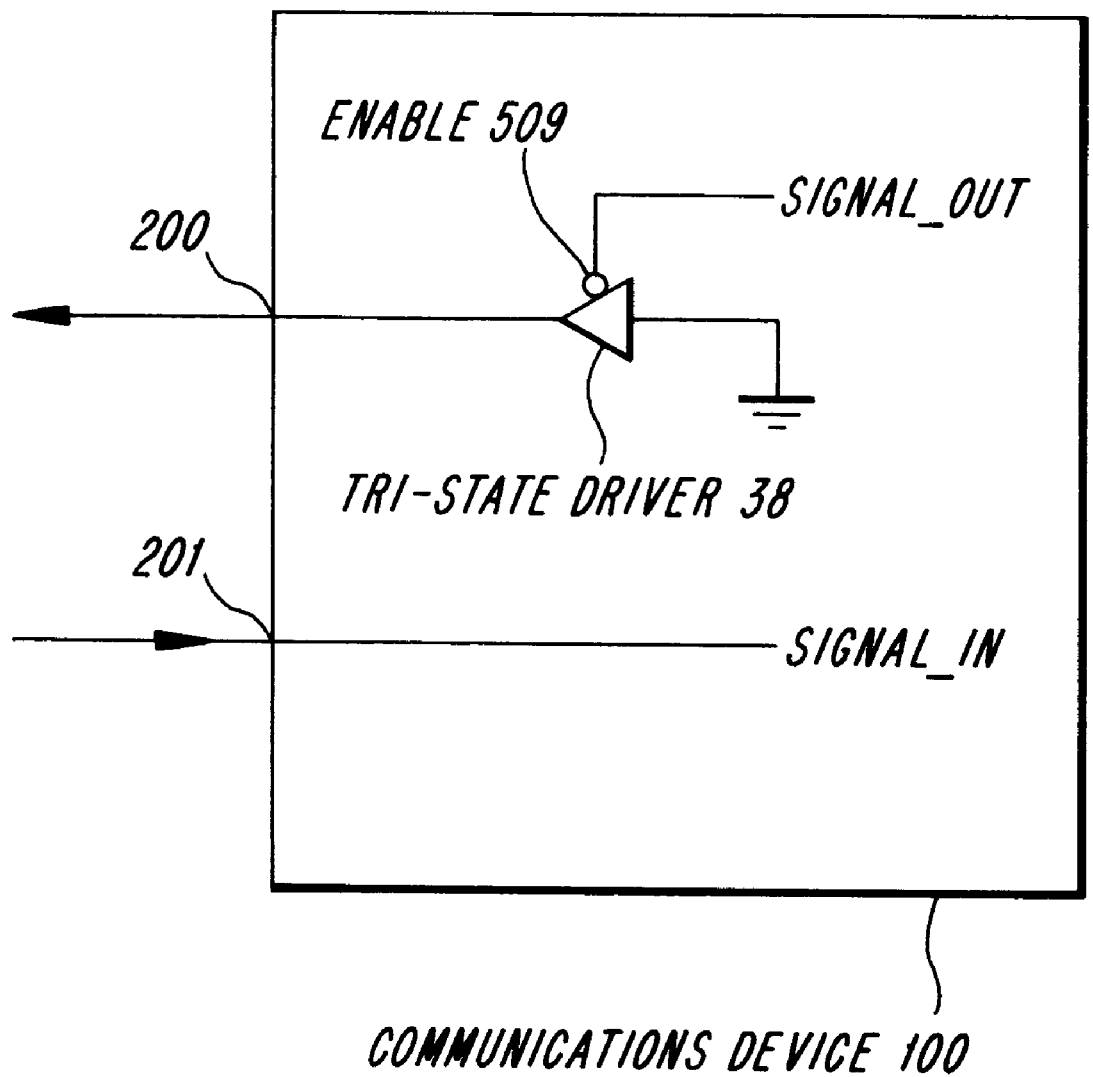
FIG. 3 is a circuit diagram showing an internal implementation of one of the communications devices of the circuit of FIG. 2.

Each of the communications devices 100, 102 and 104 can have an internal configuration as shown in FIG. 3.

FIG. 3 shows an internal configuration of the communications device 100 including a tri-state driver 38. An input of the tri-state driver 38 is connected to ground, an enable 509 of the tri-state driver 38 is connected to a signal_out line, and an output of the tri-state driver 38 is connected to the output data line 200. A signal_in line is connected directly to the input data line 201.

Signals on the signal_in and signal_out lines are respectively received and generated by the communications device 100. For example, the communications device can be microcontroller connected to the tri-state driver 509, to generate output signals and receive input signals in accordance with its particular function and purpose.

The tri-state driver functions in a fashion similar to that of the level shifters described above. When a logical LOW signal is applied to the enable 509 by the signal_out line, the tri-state driver 38 outputs a logical LOW on the output data line 200. When a logical HIGH signal is applied to the enable 509 by the signal_out line, the tri-state driver 38 is turned off, and the output data line 200 floats.

The pullup resistor 400 allows the communications device to output a logical HIGH signal on the output data line 200 in response to a logical HIGH signal applied to the enable 509.

If the input and output data lines 200 and 201 are connected together to form a single line and the operating voltage of the communications device 108 is $V_A$, then the communications device 108 can function as the communications device 106 in FIG. 2.

In the situation where the communications device 100 has an internal configuration that can provide a logical HIGH output on the output data line 200, the pullup resistor 400 is optional.

Where the input data lines 201, 203 and 205 are connected to only one line, as shown in FIG. 2, then the level shifters 501, 503 and 505 can alternatively be level shifters that output a logical HIGH signal in response to a logical HIGH signal applied to the inputs of the level shifters 501, 503 and 505, instead of a floating output.

As described further above, each of the communications devices shown in FIG. 2 can receive a signal from any of the other communications devices. For example, when the communications device 102 outputs a logical LOW signal at the output data line 202, the level shifter 502 outputs a logical LOW signal onto the bidirectional data line 380, thus causing the other level shifters 501, 505 and the communications device 206 to receive a logical LOW signal. The level shifters 501 and 505 accordingly output a logical LOW signal to the input data lines 201 and 205 of the communications devices 100 and 104. Thus, each of the other communications devices 100, 104 and 106 receives a logical LOW signal that corresponds to the logical LOW signal output by the communications device 102.

Figure 4:
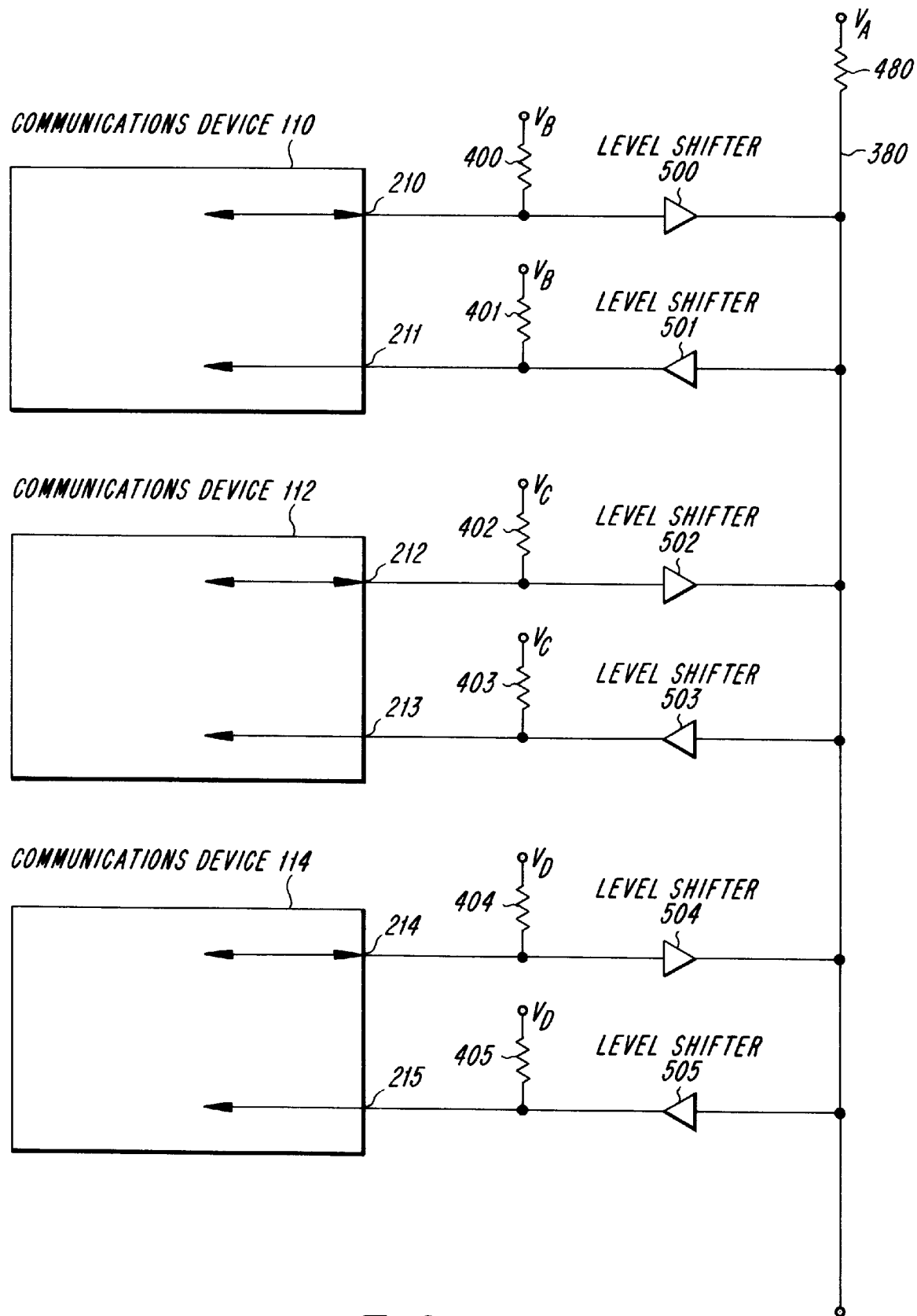
FIG. 4 is a circuit diagram showing a second I²C-compliant circuit according to the invention.

FIG. 4 is a circuit diagram showing a second I²C-compliant circuit in accordance with the invention. The circuit shown in FIG. 4 is similar to the circuit shown in FIG. 2, except that lines 210, 212 and 214 of the communications devices 110, 112 and 114 are input/output data lines. A conventional communications device having a single input/output data line is not shown.

The input data lines 211, 213 and 215 shown in FIG. 4 function in the same way as the input data lines 201, 203 and 205 shown in FIG. 2. All other elements of the circuit shown in FIG. 4 are the same as those shown in FIG. 2 and are similarly named.

Although the data lines 210, 212 and 214 are input/output data lines, in the circuit of FIG. 4 the lines 210, 212 and 214 function only as output data lines. Accordingly, the function of the circuit shown in FIG. 4 is the same as that described above with respect to FIG. 2.

Figure 5:
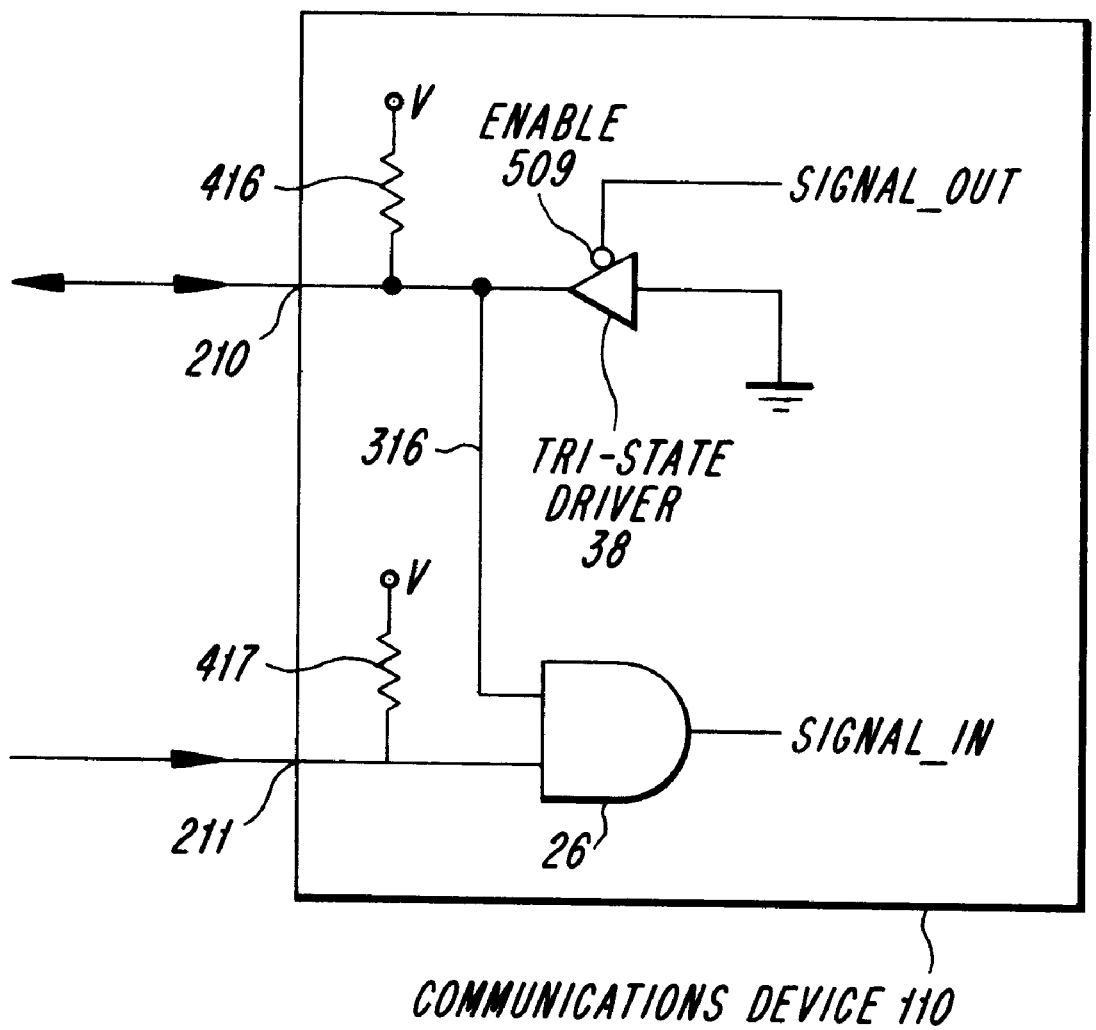
FIG. 5 is a circuit diagram showing an internal implementation of one of the communications devices of the circuit of FIG. 4.

Each of the communications devices 110, 112 and 114 of FIG. 4 can have an internal configuration as shown in FIG. 5.

FIG. 5 shows the communications device 110 having an internal configuration similar to that of FIG. 3, but further including a link line 316, pullup resistors 416 and 417, and an AND gate 26. The tri-state driver and the signal_out line function in the same way described above with respect to FIG. 3.

The link line 316 couples the input/output data line 210 to the upper input of the AND gate 26, as shown in FIG. 5. Accordingly, a logical LOW signal applied to the input/output data line 210 will cause the AND gate 26 to output a logical LOW signal on the signal_in line. Thus, the link line 316 and the AND gate 26 allow the data line 210 to function as an input data line.

The pullup resistor 416 is connected at one end to a voltage source having a voltage V corresponding to an operating voltage of the communications device 110, and is connected at the other end to the input/output data line 210. The pullup resistor 417 is connected at one end to a voltage source having a voltage V corresponding to an operating voltage of the communications device 110, and is connected at the other end to the input data line 211.

It will be appreciated that the internal resistors 416, 417 shown in FIG. 5 can replace the external resistors 400, 401 shown in FIG. 4. Both internal and external pullup resistors would be present, for example, in the situation where a communications device in the circuit which has no internal pullup resistor is replaced with a communications device which does have an internal pullup resistor.

Figure 6:
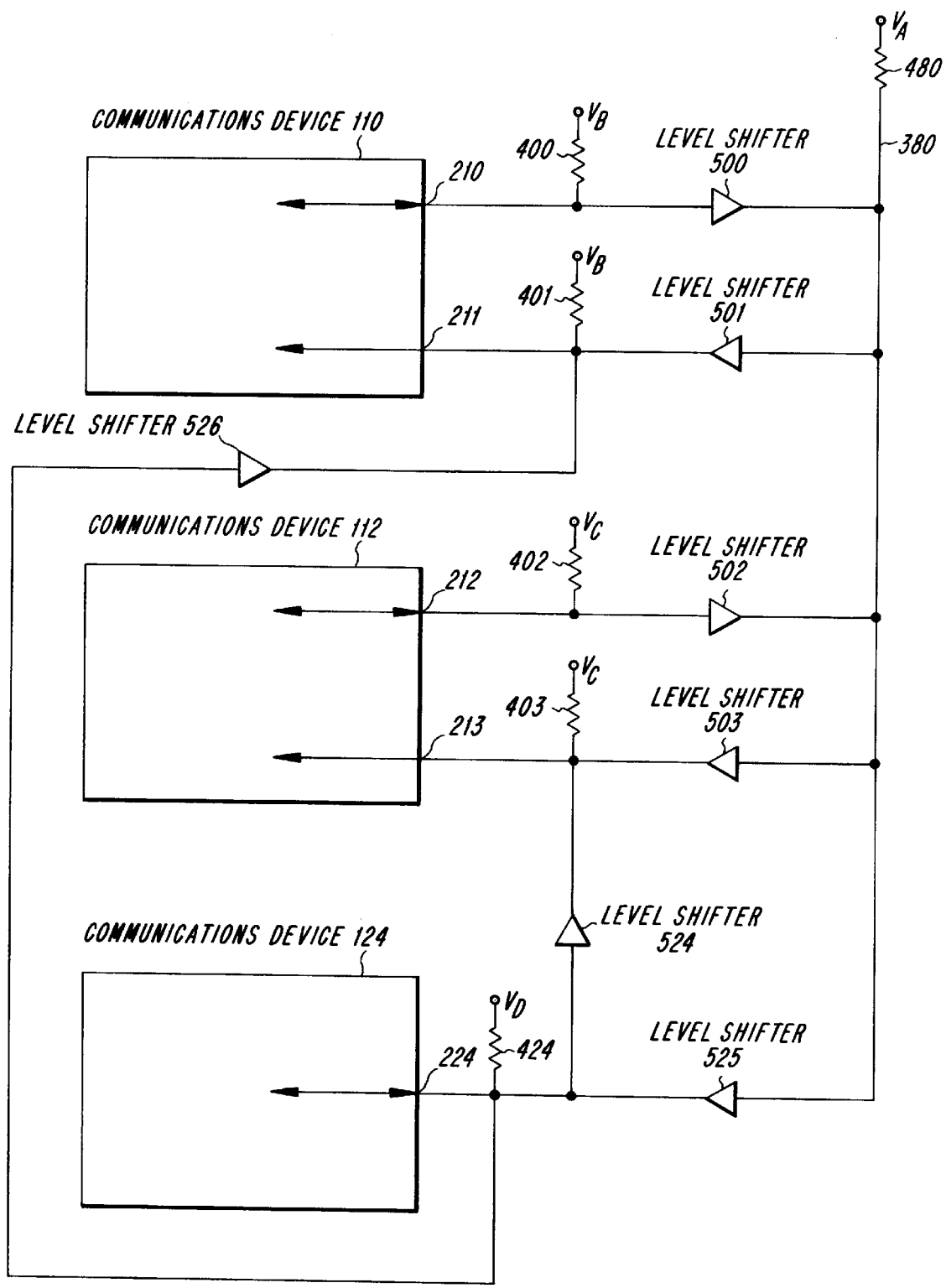
FIG. 6 is a circuit diagram showing a third I²C-compliant circuit according to the invention.

FIG. 6 is a circuit diagram showing a third I²C-compliant circuit in accordance with the invention. The circuit includes two communications devices 110 and 112 having input/output data lines 210, 212 and input data lines 211, 213. The communications devices 110 and 112 are the same as shown in FIG. 4, and have the same operation and configuration. The communications device 124 has a single input/output data line 224. Each of the operating voltages $V_A$, $V_B$, $V_C$ and $V_D$ is different from the other operating voltages.

The level shifter 525 transfers signals from the bidirectional data line 380 to the communications device 124. The level shifters 524 and 526 transfer signals from the communications device 124 to the communications devices 112 and 110, respectively. The level shifters 524, 525 and 526 operate in the same way as the level shifters shown in FIG. 2 and described above.

The inputs of the level shifters 524 and 526 and the output of the level shifter 525 are connected to the input/output data line 224 of the communications device 124. The input of the level shifter 525 is connected to the bidirectional bus 380, the output of the level shifter 524 is connected to the input data line 213 of the communications device 112, and the output of the level shifter 526 is connected to the input data line 211 of the communications device 110.

In addition, a pullup resistor 424 is connected at one end to a voltage source corresponding to the operating voltage $V_D$ of the communications device 124, and connected at the other end to the input/output data line 224 of the communications device 124.

As described above, each of the communications devices in FIG. 6 can receive a signal from any of the other communications devices. For example, the communications device 110 can output a logical LOW signal to each of the communications devices 112, 124 by generating a logical LOW at the input/output data line 210. In response, the level shifter 500 outputs a logical LOW signal onto the bidirectional data line 380, which in turn causes the level shifters 503 and 525 to each output a logical LOW signal to the input data line 213 and the input/output data line 224 of the communications devices 112 and 124. Communications device 112 can output a logical LOW signal to the communications devices 110 and 124 in a similar fashion.

When the communications device 124 outputs a logical LOW signal at its input/output data line 224, the level shifters 524 and 526 each output a logical LOW signal to the input data lines 213, 211 of the communications devices 110 and 112.

Thus, each of the communications devices 110, 112 and 124 can output a logical LOW signal to the other communications devices 110, 112 and 124, even though each of the communications devices 110, 112 and 124 has an operating voltage that is different from the operating voltages of the other communications devices 110, 112 and 124, and different from the operating voltage of the bidirectional data line 380.

Since the circuit shown in FIG. 6 does not provide any input to the data lines 210 and 212, it will be appreciated that the data lines 210 and 212 can alternatively be unidirectional output data lines.

FIG. 7 is a circuit diagram showing a fourth I²C-compliant circuit in accordance with the invention, wherein communications devices are connected in patterns that include the circuits shown in FIGS. 1, 2, 4 and 6.

FIG. 7 shows communications devices 136, 138, 140, 142, 144, 146, 148, 150, 152 and 154, and bidirectional data line 380. The communications devices 136, 138 and 146 have operating voltages of $V_B$, $V_C$ and $V_E$ respectively. Communications devices 140 and 142 have an operating voltage of $V_D$. Communications devices 148 and 150 have an operating voltage of $V_F$, and communications devices 144, 152 and 154 have an operating voltage of $V_A$.

The communications device 136 is connected to the bidirectional data line 380, and an input data line 237 of the communications device 136 is connected to the communications device 142 by a level shifter 543.

Specifically, the communications device 136 has an output data line 236 that connects to one end of a pullup resistor 436 and to an input of level shifter 536. The other end of the pullup resistor 436 is connected to the operating voltage $V_B$. The output of the level shifter 536 is connected to the bidirectional data line 380. An input data line 237 of the communications device 136 is connected to one end of a pullup resistor 437 and to an output of level shifter 537. The other end of the pullup resistor 437 is connected to a voltage source of the communications device 136. The input of the level shifter 537 is connected to the bidirectional data line 380.

The communications devices 138 and 140 are connected in the same way as the communications device 136. Pullup resistors 438, 439, 440, and 441 correspond to pullup resistors 436 and 437; level shifters 538, 539, 540 and 541 correspond to level shifters 536, 537; and lines 238, 239, 240 and 241 correspond to line 236 and 237. However, lines 238 and 240 are bidirectional.

The communications device 142 has an input/output data line 242 that connects to the input data line 241 of the communications device 140. The input/output data line 242 also connects to inputs of the level shifters 542 and 543, whose outputs connect respectively to the input data lines 239 and 237 of the communications devices 138 and 136. The input/output data line 242 of the communications device 142 also connects to an input data line 245 of the communications device 244 via a level shifter 544. An input of the level shifter 544 is connected to the input/output data line 242, and an output of the level shifter 544 is connected to the input data line 245.

The communications device 144 also includes an input/output data line 244 that connects directly to the bidirectional data line 380. One end of a pullup resistor 445 is connected to the input data line 245, and the other end of the pullup resistor 445 is connected to a voltage source which provides the operating voltage $V_A$. This operating voltage is the same as the operating voltage of the bidirectional data line 380.

Accordingly, the communications device 144 can receive signals present on the bidirectional data line 380 either through the input/output data line 244 connected directly to the bidirectional data line 380, or through the input data line 245 connected indirectly to the bidirectional data line 380 by the level shifters 541 and 544. Thus, the data line 244 need only function as an output data line. However, if the communications device 142 and its level shifter 544 were removed or disabled, then the data line 244 would need to be bidirectional, i.e., an input/output data line, to enable the communications device 144 to communicate with other communications devices via the bidirectional data line 380.

Subnets such as the communications device 142 and its level shifter 544 can be removed or disabled, for example, to conserve power or increase security.

The communications device 146 has an output data line 246 that connects to one end of a pullup resistor 446 and to an input of level shifter 546. The other end of the pullup resistor 446 is connected to a voltage source which provides the operating voltage $V_E$. The output of the level shifter 546 is connected to the bidirectional data line 380. An input data line 247 of the communications device 146 is connected to an output of level shifter 547. The input of the level shifter 547 is connected to the bidirectional data line 380.

In the embodiment of FIG. 7, there is no external pullup resistor connected to the input data line 247. In such an embodiment the level shifter 547 preferably outputs a logical HIGH signal in response to a logical HIGH signal on the bidirectional data line 380. Alternatively, the communications device 146 can be provided with an internal pullup resistor connected internally to the input data line 247 in the same way that the pullup resistor 417 is connected to the input data line 211 in FIG. 5. Further, an external pullup resistor can be provided.

The communications device 148 is connected to the bidirectional data line 380, and an input/output data line 248 of the communications device 148 is connected directly to the communications device 150.

Specifically, the communications device 148 has an input/output data line 248 that connects to one end of a pullup resistor 448 and to an input of level shifter 548. The other end of the pullup resistor 448 is connected to a voltage source which provides the operating voltage $V_F$. The output of the level shifter 548 is connected to the bidirectional data line 380. An input data line 249 of the communications device 148 is connected to one end of a pullup resistor 449 and to an output of level shifter 549. The other end of the pullup resistor 449 is connected to a voltage source having a voltage $V_F$. The input of the level shifter 549 is connected to the bidirectional data line 380.

The communications device 150 has an input/output data line 250 connected directly to the input/output data line 248 of the communications device 148.

The input/output data line 248 need function only as an output data line in order for the communications device 148 to communicate with other communications devices connected to the bidirectional data line 380. However, to enable the communications devices 148 and 150 to communicate with each other, the input/output data line 248 preferably functions as both an input and an output.

The communications device 152 has an input/output data line 252 connected directly to the bidirectional data line 380, and an input data line 253 connected to one end of a pullup resistor 452. The other end of the pullup resistor 452 is connected to a voltage source having a voltage $V_A$. Alternatively, the input data line 253 could be connected directly to the bidirectional data line 380 instead of to the pullup resistor 452, without altering the performance or behavior of the communications device 152. If the data line 252 were an output data line instead of an input/output data line, then the output data line 253 would preferably be connected to the bidirectional data line 380.

The communications device 154 has an input/output data line 254 connected directly to the bidirectional data line 380.

The connections and functional relationship between the communications device 136 of FIG. 7 and the bidirectional data line 380 are substantially the same as those between the communications devices 100, 102, and 104 and the bidirectional data line 380 shown in FIG. 2 and described further above.

The connections and functional relationship between the communications devices 138 and 140 of FIG. 7 and the bidirectional data line 380 are substantially the same as those between the communications devices 110, 112 and 114 and the bidirectional data line 380 shown in FIG. 4 and described further above.

The connections and functional relationship between the communications devices 142, 138 and 136 of FIG. 7 are the same as those between the communications devices 124, 122 and 120 of FIG. 6.

Since the communications devices 140 and 142 of FIG. 7 have the same operating voltage of $V_D$, both can receive input from the bidirectional data line 380 through the level shifter 541, instead of each of the communications devices 140 and 142 receiving input from the bidirectional data line 380 through separate level shifters.

Since the data line 242 is bidirectional, to prevent malfunction neither the communications device 142 nor the level shifter 541 actively outputs a logical HIGH signal.

If the communications device 142 were to actively output a logical HIGH signal instead of a floating output that would allow the pullup resistor 441 to pull the voltage at the input/output data line 242 to $V_D$, then a conflict could occur when a logical LOW signal is present on the bidirectional data line 380. When a logical LOW signal is present on the bidirectional data line 380, the level shifter 541 outputs a logical LOW signal which conflicts with a logical HIGH signal output by the communications device 142, thereby violating the I²C protocol and causing a short circuit that could damage the level shifter 541 and the communications device 142.

If the level shifter 541 were to actively output a logical HIGH signal instead of a floating signal in response to a logical HIGH input, then a conflict could occur when the communications device 142 outputs a logical LOW signal, thereby violating the I²C protocol and causing a short circuit that could damage the level shifter 541 and the communications device 142.

Accordingly, neither the level shifter 541 nor the communications device 142 should ever actively output a logical HIGH signal.

The communications device 144 is connected in such a way that its input/output data line 244 is directly connected to the bidirectional data line 380, and its input data line 245 is connected to the input/output data line 242 of the communications device 142 through the level shifter 544.

In the network configuration shown in FIG. 7, each of the communications devices can exchange signals with each of the other communications devices, except for communications devices 142 and 150.

The communications device 142 in this embodiment can receive signals from all of the other communications devices, but can send signals only to the communications devices 136, 138, 140 and 144.

For example, the communications device 142 can receive signals from all other communications devices in the network through the bidirectional data line 380 and the level shifter 541, and can send signals only to the communications devices 136, 138 and 140. Accordingly, the communications device 142 can communicate only with the communications devices 136, 138 and 140. In addition, the communications device 142 can act as a master (to one of the communications devices 136, 138 and 140) only when all other communications devices except for the communications devices 136, 138 and 140 can only act as slaves.

The communications device 150 in this embodiment can send signals to all of the other communications devices, but can receive signals only from the communications device 148. Accordingly, the communications device 150 can communicate only with the communications device 148, and can only act as a master to the communications device 150 when the communications devices 148 and 150 are isolated from the other communications devices in the network.

Each of the communications devices 136, 138, 140 and 144 can act as a master because each can receive signals from all other communications devices in the network of FIG. 7. For example, the communications device 136 can receive signals from communications devices 138, 140, 144, 146, 148, 150, 152, and 154 through the level shifter 537 and the bidirectional data line 380, and can receive signals from communications device 142 through the level shifter 543.

Those communications devices that cannot receive signals from the communications device 142, for example the communications devices 148 and 154, cannot act as masters unless the communications device 142 is removed from the network or disabled.

In summary, the present invention provides an apparatus and method for connecting communications devices having different operating voltages using unidirectional level shifters, wherein the communications devices exchange information in compliance with the I²C protocol. Thus, the invention extends the use of the I²C protocol to systems having communications devices with different operating voltages. The invention also allows communications devices having different operating voltages to easily be connected to conventional systems that observe the I²C protocol, thus increasing the versatility of conventional systems.

Although the invention has been described in detail with reference only to presently preferred embodiments, those skilled in the art will appreciate that various modifications can be made without departing from the invention. For example, the unidirectional level shifters can be implemented as discrete devices, or can be embedded into communication devices or any type of application-specific integrated circuit (ASIC). Accordingly, the invention is defined only by the following claims which are intended to embrace all equivalents thereof.

What is claimed is:

1. A communications system comprising:

a first communications device having a first operating voltage level, and having at least a first terminal and a second terminal;

a first level shifter connected between the first terminal and a bidirectional line, the bidirectional line having a second operating voltage level; and a second level shifter connected between the second terminal and the bidirectional line;

wherein the first terminal is both an input and an output of the first communications device.

2. The system of claim 1, wherein the second terminal is an input of the first communications device.

3. The system of claim 1, wherein the first terminal is an output of the first communications device.

4. The system of claim 1, wherein each level shifter is unidirectional.

5. The system of claim 1, wherein the second level shifter outputs a logical LOW when a logical LOW is applied to the input of the second level shifter, and the second level shifter outputs a logical HIGH when a logical HIGH is applied to the input of the second level shifter, and wherein the second terminal is an input of the first communications device.

6. The system of claim 1, wherein:

an input of the first level shifter is connected to the first terminal;

an output of the first level shifter is connected to the bidirectional line;

an input of the second level shifter is connected to the bidirectional line; and an output of the second level shifter is connected to the second terminal.

7. The system of claim 1, further comprising:

a second communications device having a third operating voltage level and a third input/output terminal;

a third level shifter connected between the third terminal and the bidirectional line; and a fourth level shifter connected between the third terminal and the second terminal.

8. The system of claim 7, wherein:

an input of the third level shifter is connected to the bidirectional line;

an output of the third level shifter is connected to the third terminal;

an input of the fourth level shifter is connected to the third terminal; and an output of the fourth level shifter is connected to the second terminal.

9. The system of claim 1, further comprising:

a second communications device having the second operating voltage level and a third input/output terminal connected to the bidirectional line.

10. A communications system comprising:

a first communications device having a first operating voltage level, and having at least a first terminal and a second terminal;

a first level shifter connected between the first terminal and a bidirectional line, the bidirectional line having a second operating voltage level;

a second level shifter connected between the second terminal and the bidirectional line; and a pullup resistor, having one end connected to the first terminal, and another end connected to a voltage source having the first operating voltage level.

11. The system of claim 10, further comprising a pullup resistor having one end connected to the second terminal, and another end connected to a voltage source having the first operating voltage level.

12. The system of claim 10, further comprising a plurality of pullup resistors, wherein each terminal of the first communications device is connected to one end of a pullup resistor of the plurality of pullup resistors, and another end of the pullup resistor is connected to a voltage source having a voltage level corresponding to the first operating voltage level.

13. A communications system comprising:

a first communications device having a first operating voltage level, and having at least a first terminal and a second terminal;

a first level shifter connected between the first terminal and a bidirectional line, the bidirectional line having a second operating voltage level; and a second level shifter connected between the second terminal and the bidirectional line, wherein at least one of the first and second level shifters outputs a logical LOW when a logical LOW is applied to the input of the at least one level shifter, and the at least one level shifter has a floating output when a logical HIGH is applied to the input of the at least one level shifter.

14. A communications system comprising:

a first communications device having a first operating voltage level, and having at least a first terminal and a second terminal;

a first level shifter connected between the first terminal and a bidirectional line, the bidirectional line having a second operating voltage level;

a second level shifter connected between the second terminal and the bidirectional line; and a second communications device having the first operating voltage level and a third input/output terminal connected to the second terminal.

15. The system of claim 14, wherein the second terminal is an input/output terminal.

16. A communications system comprising:

a first communications device having a first operating voltage level, and having at least a first terminal and a second terminal;

a first level shifter connected between the first terminal and a bidirectional line, the bidirectional line having a second operating voltage level;

a second level shifter connected between the second terminal and the bidirectional line;

a second communications device having a third operating voltage level and a third input/output terminal;

a third level shifter connected between the third terminal and the bidirectional line;

a third communications device having the second operating voltage level and at least a fourth input/output terminal connected to the bidirectional line and a fifth terminal; and a fourth level shifter connected between the fifth terminal and the third terminal.

17. The system of claim 16, wherein:
an input of the third level shifter is connected to the bidirectional line;
an output of the third level shifter is connected to the third terminal;
an input of the fourth level shifter is connected to the third terminal; and
an output of the fourth level shifter is connected to the fifth terminal.

18. A communications system comprising:
a first communications device having a first operating voltage level, and having at least a first terminal and a second terminal;
a first level shifter connected between the first terminal and a bidirectional line, the bidirectional line having a second operating voltage level;
a second level shifter connected between the second terminal and the bidirectional line;
a pullup resistor connected at one end to a voltage source having the second operating voltage level; and
a second communications device having the second operating voltage level, a third input/output terminal connected to the bidirectional line and a fourth terminal connected to the other end of the pullup resistor.

19. A communications system comprising:
a first communications device having a first operating voltage level, and having at least a first terminal and a second terminal;
a first level shifter connected between the first terminal and a bidirectional line, the bidirectional line having a second operating voltage level; and
a second level shifter connected between the second terminal and the bidirectional line,
wherein the first communications device further comprises a tri-state driver having an output connected to the first terminal, an input connected to ground, and an enable for receiving a signal to be output onto the first terminal.

20. The communications system of claim 19, wherein the communications device further comprises:
an AND gate having a first input connected to the first terminal, a second input connected to the second terminal, and an output for providing a received input signal;
a first pullup resistor having one end connected to the first terminal and another end connected to a voltage source having a voltage level corresponding to the first operating voltage level; and
a second pullup resistor having one end connected to the second terminal and another end connected to a voltage source having a voltage level corresponding to the first operating voltage level.

21. A communications device having a first operating voltage level and connected to a bidirectional line having a second operating voltage level, comprising:
at least a first terminal and a second terminal;
a first level shifter connected between the first terminal and the bidirectional line; and
a second level shifter connected between the second terminal and the bidirectional line,
wherein the first terminal is both an input and an output of the communications device.

22. A communications device having a first operating voltage level and connected to a bidirectional line having a second operating voltage level, comprising:

at least a first terminal and a second terminal;
a first level shifter connected between the first terminal and the bidirectional line;
a second level shifter connected between the second terminal and the bidirectional line; and
a pullup resistor, having one end connected to the first terminal, and another end connected to a voltage source having the first operating voltage level.

23. The device of claim 22, further comprising a pullup resistor having one end connected to the second terminal, and another end connected to a voltage source having the first operating voltage level.

24. The device of claim 22, further comprising a plurality of pullup resistors, wherein each terminal of the communications device is connected to one end of a pullup resistor of the plurality of pullup resistors, and another end of the pullup resistor is connected to a voltage source having a voltage level corresponding to the first operating voltage level.

25. A communications device having a first operating voltage level and connected to a bidirectional line having a second operating voltage level, comprising:
at least a first terminal and a second terminal;
a first level shifter connected between the first terminal and the bidirectional line; and
a second level shifter connected between the second terminal and the bidirectional line,
wherein at least one of the first and second level shifters outputs a logical LOW when a logical LOW is applied to the input of the at least one level shifter, and the at least one level shifter has a floating output when a logical HIGH is applied to the input of the at least one level shifter.

26. A method for transmitting data among a plurality of communications devices having different operating voltages, the method comprising the steps of:
shifting a first logical HIGH signal, generated by a first communications device and having a first operating voltage level, to a second operating voltage level corresponding to a second communications device;
shifting a second logical HIGH signal, generated by the second communications device and having the second operating voltage level, to the first operating voltage level;
providing the shifted first signal to the second communications device;
providing the shifted second signal to the first communications device;
logically ANDing logical signals provided to the first communications device; and
logically ANDing logical signals provided to the second communications device.

27. The method of claim 26, the method further comprising the step of:
logically ANDing logical signals provided to the first: communications device together with at least one logical signal provided by the first communications device to generate an input signal for the first communications device.

28. The method of claim 26, wherein the method complies with an I$^2$C bidirectional serial protocol.

* * * * *